(12) United States Patent
Sankaradas et al.

(10) Patent No.: US 9,970,776 B2
(45) Date of Patent: May 15, 2018

(54) WIFI-BASED INDOOR POSITIONING AND NAVIGATION AS A NEW MODE IN MULTIMODAL TRANSIT APPLICATIONS

(71) Applicant: NEC Laboratories America, Inc., Princeton, NJ (US)

(72) Inventors: Murugan Sankaradas, Dayton, NJ (US); Kunal Rao, Monmouth Junction, NJ (US); Srimat Chakradhar, Manalapan, NJ (US)

(73) Assignee: NEC Corporation (JP)

( * ) Notice: Subject to any disclaimer, the term of this patent is extended or adjusted under 35 U.S.C. 154(b) by 96 days.

(21) Appl. No.: 15/088,352

(22) Filed: Apr. 1, 2016

(65) Prior Publication Data
US 2016/0298978 A1    Oct. 13, 2016

Related U.S. Application Data

(60) Provisional application No. 62/144,617, filed on Apr. 8, 2015.

(51) Int. Cl.
*G01C 21/34* (2006.01)

(52) U.S. Cl.
CPC ................ *G01C 21/3423* (2013.01)

(58) Field of Classification Search
CPC .......... G06F 17/21; G06F 17/27; G06F 17/28; G06F 17/30
USPC .......... 701/465, 468; 707/722, 769; 715/234
See application file for complete search history.

(56) References Cited

U.S. PATENT DOCUMENTS

| | | | |
|---|---|---|---|
| 8,935,279 B2* | 1/2015 | Skeen | H04L 65/4084 707/754 |
| 9,633,000 B2* | 4/2017 | Muller | G06F 17/2735 |
| 2008/0086455 A1* | 4/2008 | Meisels | G01C 21/26 |
| 2012/0136572 A1* | 5/2012 | Norton | G01C 21/3407 701/465 |
| 2012/0236201 A1* | 9/2012 | Larsen | G06Q 10/10 348/468 |
| 2014/0082479 A1* | 3/2014 | Guinane | G06F 17/2247 715/234 |
| 2014/0278070 A1* | 9/2014 | McGavran | G01C 21/00 701/465 |
| 2015/0058324 A1* | 2/2015 | Kauwe | G06Q 50/01 707/722 |
| 2016/0076902 A1* | 3/2016 | Diaz | G01C 21/3629 701/468 |
| 2016/0202076 A1* | 7/2016 | Feng | G01C 21/343 701/408 |
| 2016/0259777 A1* | 9/2016 | Muller | G06F 17/2735 |

(Continued)

*Primary Examiner* — Thomas G Black
*Assistant Examiner* — Wae L Louie
(74) *Attorney, Agent, or Firm* — Joseph Kolodka

(57) ABSTRACT

A system for planning a trip includes heterogeneous data sources including map data, traffic information, vehicle trace data, weather reports, social media data, commuter feedback data, GIS data, travel time data; a stream analytics engine coupled to the heterogeneous data sources; a batch analytics engine coupled to the heterogeneous data sources; and a multi-modal journey planner coupled to the stream analytics engine and the batch analytics engine, the multi-modal journey planner processing indoor travel information and providing real-time updates while a journey is under progress, the multi-modal journey planner providing a journey time forecast as the journey time reflects indoor travel time.

19 Claims, 2 Drawing Sheets

(56) References Cited

U.S. PATENT DOCUMENTS

2016/0298978 A1\* 10/2016 Sankaradas ........ G01C 21/3423
2017/0032384 A1\* 2/2017 Harris ................ G06Q 30/0201
2017/0251261 A1\* 8/2017 James ................ H04N 21/4725

\* cited by examiner

WIFI-BASED INDOOR POSITIONING AND NAVIGATION AS A NEW MODE IN MULTIMODAL TRANSIT APPLICATIONS

This application claims priority to Provisional Application 62/144,617, filed Apr. 8, 2015, the content of which is incorporated by reference.

BACKGROUND

The present invention relates to systems and methods for multi-modal journey planning.

In urban areas, commuters are often faced with variety of modes of transportation like buses, trains, walking, bicycles, and motorcycles. During their daily commutes, they pass through complex indoor environments like train stations, bus stations, multi-storey buildings and offices, shopping malls, supermarket, libraries, underground parking lots, etc. Indoor travel time and associated delays is significant portion for most average commuters. Traditional route planners and GPS devices do not work in indoor environments and their travel time estimates are generally less accurate. Also in case of public transportation, traditional route planners provide static routes and they do not advise the user with dynamic route alternatives based on onward travel anomalies, while the journey is in progress.

OneBusAway provides real-time transit information for buses only. This is not a multimodal planner. Users have to have different applications while traversing using different modes of transport in urban environments. OpenTripPlanner provides static multi-modal routes. It cannot help the commuter while travelling, by providing dynamic trip updates. Moovit is a real time local transit planner application. It is a multimodal transit navigator and it can track the user while on the move by providing stop information but it cannot track the user indoors. It also cannot provide indoor routes. Transit app, How2Go app and CityMapper apps are multi-modal public transportation navigation applications for urban environments. They all don't track the user while the journey is in progress and also they don't have indoor map or localization capability.

SUMMARY

In one aspect, the system for planning a trip includes heterogeneous data sources including map data, traffic information, vehicle trace data, weather reports, social media data, commuter feedback data, GIS data, travel time data; a stream analytics engine coupled to the heterogeneous data sources; a batch analytics engine coupled to the heterogeneous data sources; and a multi-modal journey planner coupled to the stream analytics engine and the batch analytics engine, the multi-modal journey planner processing indoor travel information and providing real-time updates while a journey is under progress, the multi-modal journey planner providing a journey time forecast as the journey time reflects indoor travel time.

In another aspect, the system includes multimodal journey planner which can guide commuters with real-time travel updates and multi-modal journey plans across all modes of transportation including mobility inside the buildings. It provides users with up-to-date indoor maps and paths. It can localize the commuter in indoor environments and help the traveler reach his destination by navigating him indoor and outdoor while using public or private transportation. It can provide dynamic route updates in response to anomalies which happen in any mode of onward journey path.

Advantages of the system may include one or more of the following. The system has indoor positioning and navigation capability and it is integrated into multimodal journey planner. Such integration, for the first time, allows indoor delays to be automatically factored into multimodal journey plans and dynamic route updates in response to traffic anomalies like accidents, road closures or congestion. As applications have unified view of all data sources, they are fast and accurate as there is no duplication of data across application modules. Any metadata based views can be cached by the system to be reused by applications.

DESCRIPTION

Figure 1:
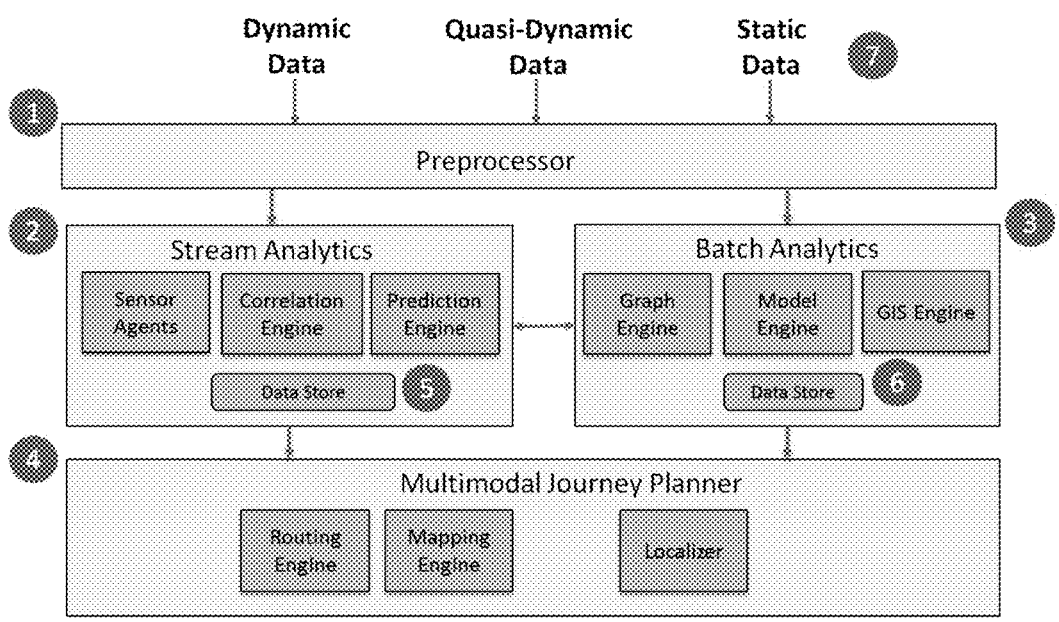
FIG. 1 shows an exemplary system architecture for multi-modal journey planning.

Referring now to the drawings in which like numerals represent the same or similar elements and initially to FIG. 1, an exemplary engine with system architecture for multi-modal journey planning is shown. FIG. 1 includes Block 1, a Preprocessor. Data obtained from external sources are raw and from independent streams (Block 7). Multiple clean up strategies are needed to manage error characteristics of different streams, filtering out bad data and handling gaps within the data streams. Different types of data types must be combined accurately to represent traffic information. Also, frequency of availability of data varies over time, and it has to be adjusted to match rates across different streams before performing analytics. Sensors on the field are also typically unreliable which leads to lack of data at various times. Preprocessing layer has to expand the lack of data to fill the holes. Along with missing data, pre-processing layer also has to take care of erroneous data due to faults, communication breakdown, etc. Key functions done by preprocessor include data integration, data transformation, spatial interpolation, feature extraction and clustering.

FIG. 1 also includes Block 2, a Stream Analytics Layer. Many transportation applications require real-time responses based on input events. Processing of streaming input events are handled through streaming analytics framework. The system consists of various modules for handling streaming input data from various data sources and serving real-time applications. Recent input data is stored in a streaming data buffer and is used in conjunction with the models from the batch framework to serve real-time applications. Processing of input data is done on-the-fly and appropriate action is taken, as specified by the applications. Some of the modules and engines in the streaming framework are real-time sensor agents, correlation engine and prediction engine.

FIG. 1 further includes Block 3, a Batch Analytics Layer. The system consists of multiple engines for offline processing of all transportation data. Offline processing is needed to build historical views from historical data samples; to build models based on training etc. This offline processing is very compute intensive and takes a long time to complete. Input data continues to grow, while the computation is in progress. This input data is not reflected in the computation results. Therefore, these engines are run periodically and results are updated, to reflect the latest changes in the input data. The output of various engines, along with the raw input data is fed into the batch data store. This data store is visible to the streaming framework as well as application layer.

Block 4 is a Multimodal Journey Planner. In current urban environments, a typical commute generally involves multiple modes of transportation including walk, car, bus, train, etc. With this "multi-modal" journey, it is important for a commuter to obtain real-time information regarding various modes in his/her transit path. It is even more critical when the journey involves travel using public transit. Various events cause delays and disruptions and makes travel difficult and at times frustrating. When commuters are empowered with real-time traffic and public transit schedules, they can make a more informed decision with respect to their journey. Also indoor travel time and associated delays is significant portion for most average commuters. Traditional route planners and GPS devices do not work in indoor environments and their travel time estimates are generally less accurate. The multimodal journey planner treats indoor as one of the mode of transportation and hence accurate journey plan and travel times are provided to commuters Block 5 is a Realtime data store. The real-time data store layer is used for exploratory and on the fly analytics directly on the streaming data. The system is column-oriented, distributed with advanced indexing structure for exploration of streaming in sub-millisecond latencies.

FIG. 1 includes Block 6, a Batch data store. Incoming data from various sources are archived in batch data store for historical analytics purpose. Batch data store allows serving arbitrarily huge dataset with high Query per second rate. Data stores with full SQL query, Graph query, GIS query are supported.

Block 7 represents Heterogeneous Data Sources that provide inputs to the system. The Data Sources consist of a heterogeneous mix of data including map data, traffic information, vehicle trace data, weather reports, social media data, commuter feedback data, GIS data, travel time data, among others.

The indoor positioning system can determine the location of a device with room level accuracy. Being a fingerprint-based system, the indoor positioning system does not provide geographic coordinates but rather symbolic identifiers as for example the number or name of a room. Instead of relying on a static fingerprint model, the indoor positioning system does not make a difference between training and usage. The indoor positioning system can be used right away and allows its user to enter the symbolic labels if necessary. As this is an ongoing process, the indoor positioning system can also easily adapt to changes in the environment, caused for example by replaced access points. For more detailed information please refer to our paper the indoor positioning system—Adaptive, Zero-Configuration Indoor Localization through User Collaboration.

To further increase the accuracy and the adaptability of the locator, The indoor positioning system allows multiple measurements taken consecutively to be added to the same fingerprint. We call this process 'Interval Labeling'. For more information on Interval Labeling please refer to our paper Improving Location Fingerprinting through Motion Detection and Asynchronous Interval Labeling. In addition, The indoor positioning system employs a two stage positioning mechanism: if fingerprints consist of only a few measurements, The indoor positioning system uses a kNN variant while SVM is used for big fingerprints.

The indoor positioning system consist of two basic components: a sniffer component that gathers and collects information about different wireless devices in range in order to create a fingerprint, and a locator component, which stores measured fingerprints in a repository and contains the algorithm to locate a mobile device. To allow easy, reliable and fast user collaboration, the locator is run as a central server. It is implemented using Java SE 6.0 and SQLite (or MySQL). As sniffer component we use an iPhone application that gathers information about different wireless devices in range.

Interval Labeling for the The indoor positioning system Client application works as follows. When a user adds a new location, the current location is stored, and an interval scanner is instantiated. The interval scanner runs in the background, and periodically performs a scan of WiFi networks, creating fingerprints by attaching the current location to the new WiFi measurements. The fingerprint is then being sent to the server and is stored there. Interval scanning is stopped whenever a significant movement is detected through the built-in iPhone accelerometer, or when the users try to either add a new location or locate themselves.

Figure 2:
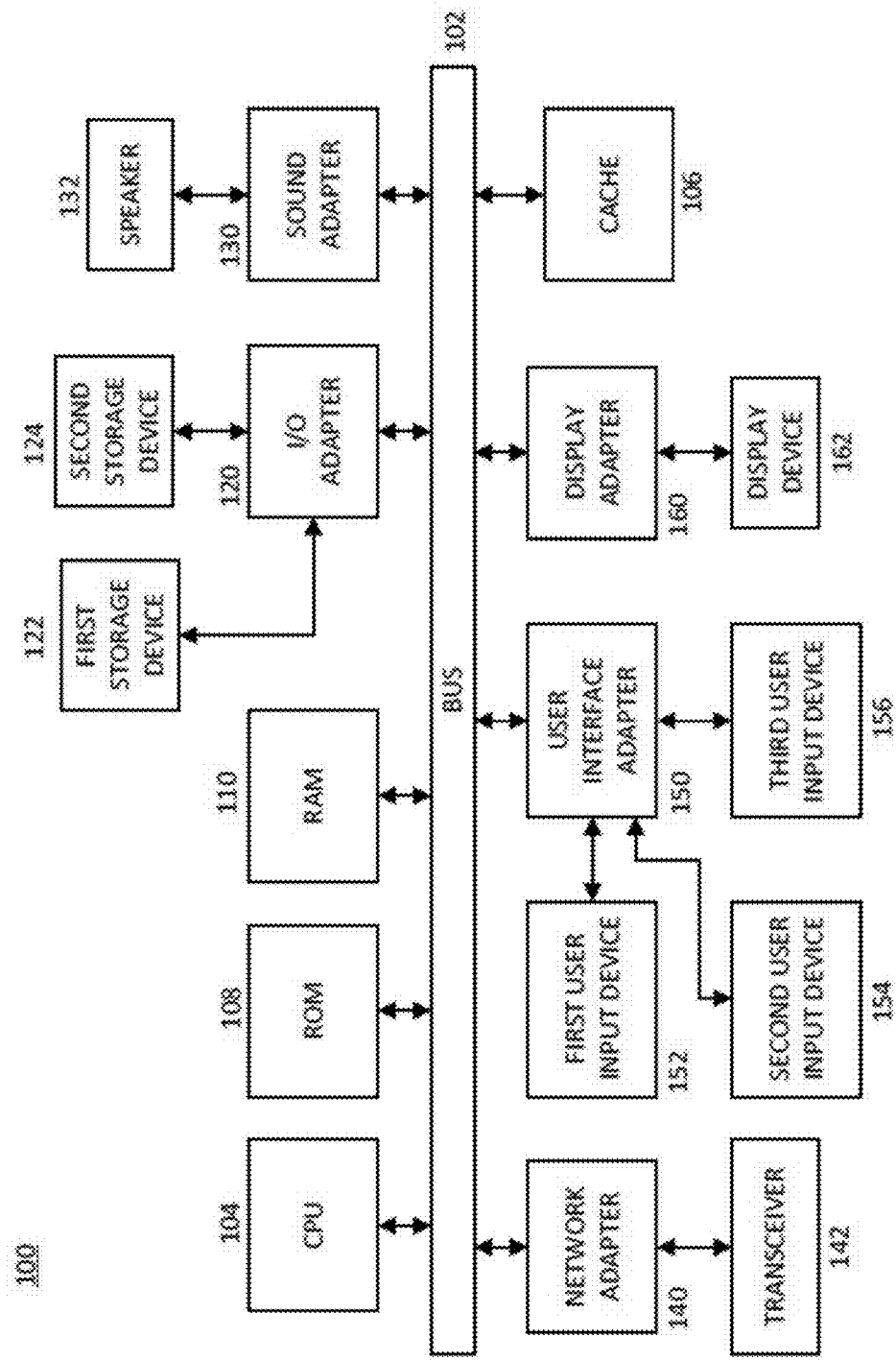
FIG. 2 shows an exemplary system to plan multi-modal journeys.

Referring now to FIG. 2, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Further, it is to be appreciated that processing system 100 may perform at least part of the methods described herein including, for example, at least part of method of FIG. 2.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A system for planning a trip, comprising:
heterogeneous data sources including map data, traffic information, vehicle trace data, weather reports, social media data, commuter feedback data, GIS data, and travel time data;
a stream analytics engine coupled to the heterogeneous data sources;
a batch analytics engine coupled to the heterogeneous data sources;
a multi-modal journey planner coupled to the stream analytics engine and the batch analytics engine, the multi-modal journey planner processing indoor travel information and providing real-time updates while a journey is under progress, the multi-modal journey planner providing a journey time forecast as the journey time reflects indoor travel time;
an indoor positioning system with navigation capability integrated into the multimodal journey planner that allows indoor delays to be automatically factored into multimodal journey plans; and
a module to perform dynamic route updates in response to traffic anomalies like accidents, road closures or congestion.

2. The system of claim 1, comprising a preprocessor coupled to the heterogeneous data sources to manage data characteristics of different data streams.

3. The system of claim 2, wherein the preprocessor considers frequency of availability over time and adjusting the frequency to match rates across different streams before performing analytics.

4. The system of claim 2, wherein the preprocessor handles data integration, data transformation, spatial interpolation, feature extraction and clustering.

5. The system of claim 2, comprising responding in real-time based on input events.

6. The system of claim 2, wherein the preprocessor performs data integration, data transformation, spatial interpolation, feature extraction and clustering of user data.

7. The system of claim 2, comprising a display showing a commuter real-time information on one or more modes in a transit path.

8. The system of claim 1, comprising modules for handling streaming input data from various data sources and serving real-time applications.

9. The system of claim 1, wherein recent input data is stored in a streaming data buffer and is used in conjunction with the models from the batch framework to serve real-time applications.

10. The system of claim 1, comprising modules and engines in the streaming analytics engine including real-time sensor agents, a correlation engine and a prediction engine.

11. The system of claim 10, wherein the engines are run periodically and results are updated to reflect the latest changes in the input data.

12. The system of claim 1, wherein the batch analytics engine comprises multiple engines for offline processing of transportation data.

13. The system of claim 12, wherein the outputs of the engines, along with the raw input data, are fed into a batch data store visible to the system and the application layer.

14. The system of claim 1, wherein the multi-modal journey planner generates alternate mode or route recommendation based on real-time travel conditions while the journey is under progress.

15. The system of claim 1, comprising a real-time data store with a real-time data store layer for exploratory and on the fly analytics directly on the streaming data.

16. The system of claim 1, wherein the real-time data store is column-oriented and distributed with an advanced indexing structure for exploration of streaming in sub-millisecond latencies.

17. The system of claim 1, comprising a batch data store, wherein incoming data from sources are archived in a batch data store.

18. The system of claim 1, wherein the heterogeneous mix of data includes map data, traffic information, vehicle trace data, weather reports, social media data, commuter feedback data, GIS data, travel time data.

19. The system of claim 1, comprising an indoor wireless area network positioning system.

* * * * *